(12) United States Patent
Suzuki et al.

(10) Patent No.: US 10,170,225 B2
(45) Date of Patent: Jan. 1, 2019

(54) PERMANENT MAGNET AND ROTATING MACHINE INCLUDING THE SAME

(71) Applicant: TDK CORPORATION, Tokyo (JP)

(72) Inventors: Kenichi Suzuki, Tokyo (JP); Shogo Kadota, Tokyo (JP); Eiichiro Fukuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 265 days.

(21) Appl. No.: 15/135,337

(22) Filed: Apr. 21, 2016

(65) Prior Publication Data

US 2016/0365181 A1    Dec. 15, 2016

(30) Foreign Application Priority Data

Apr. 21, 2015  (JP) ................. 2015-086570

(51) Int. Cl.
| | |
|---|---|
| *H01F 1/00* | (2006.01) |
| *H01F 1/03* | (2006.01) |
| *H01F 10/26* | (2006.01) |
| *H01F 7/02* | (2006.01) |
| *H01F 10/16* | (2006.01) |
| *C22C 38/10* | (2006.01) |
| *H02K 1/02* | (2006.01) |
| *H01F 1/047* | (2006.01) |
| *H01F 41/18* | (2006.01) |

(52) U.S. Cl.
CPC ........... *H01F 1/0306* (2013.01); *C22C 38/10* (2013.01); *C22C 38/105* (2013.01); *H01F 7/021* (2013.01); *H01F 10/16* (2013.01); *H01F 10/265* (2013.01); *H02K 1/02* (2013.01); *H01F 1/047* (2013.01); *H01F 41/18* (2013.01)

(58) Field of Classification Search
CPC ....................................................... H01F 7/0226
See application file for complete search history.

(56) References Cited

U.S. PATENT DOCUMENTS 4,540,453 A * 9/1985 Boredelon ............. H01F 1/147
148/310
2011/0240909 A1    10/2011 Kanda et al.
(Continued)

FOREIGN PATENT DOCUMENTS

| JP | S5946008 A | 3/1984 |
| JP | 2011-211106 A | 10/2011 |
| JP | 2014-194958 A | 10/2014 |

OTHER PUBLICATIONS

H. Omiya et al. "Magnetic properties of Rh/FeCo film grown on MgO(001) substrate;" Digests of the 38th Annual Conference on Magnetics in Japan; Sep. 2014.
(Continued)

*Primary Examiner* — Erin B Saad
(74) *Attorney, Agent, or Firm* — Oliff PLC

(57) ABSTRACT

A permanent magnet having a periodic structure with the concentrations of Fe and T (T is one or more transition metal elements with Co or Ni as necessity) changing alternately, wherein, the concentrations change with a period of 3.3 nm or less and the concentration difference of Fe in the concentration change is 5 at % or more. The permanent magnet has a high saturation magnetization Is and coercivity HcJ and can be prepared even without rare earth element(s) R.

4 Claims, 2 Drawing Sheets

(56) References Cited

U.S. PATENT DOCUMENTS

2015/0348812 A1* 12/2015 White .................. H01F 7/0252
                                                    427/282
2018/0075958 A1*  3/2018 White .................. H01F 7/0226

OTHER PUBLICATIONS

T. Burkert et al; Giant Magnetic Anisotropy in Tetragonal FeCo Alloys; The American Physical Society; Jul. 2004; vol. 93; No. 2; pp. 1-4.

* cited by examiner

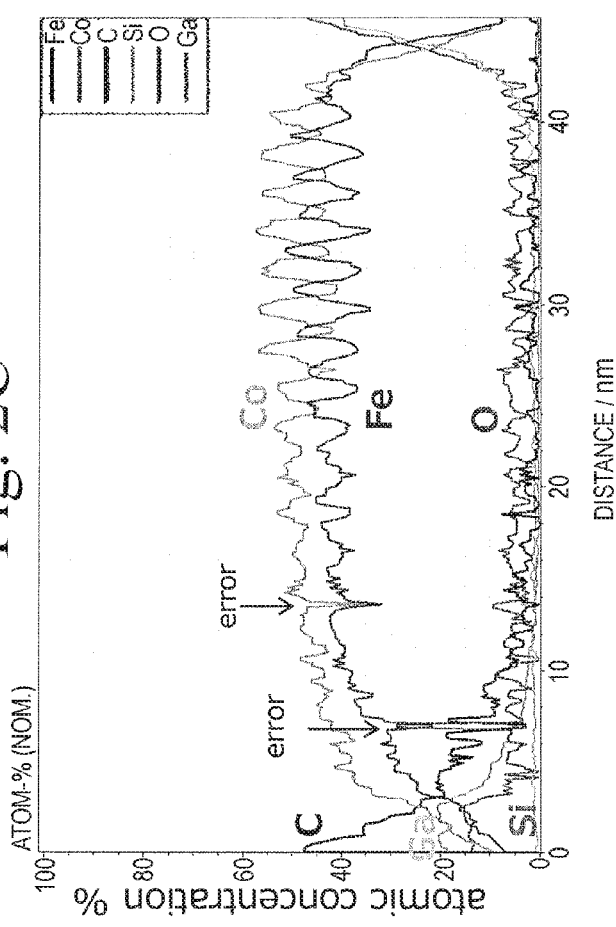
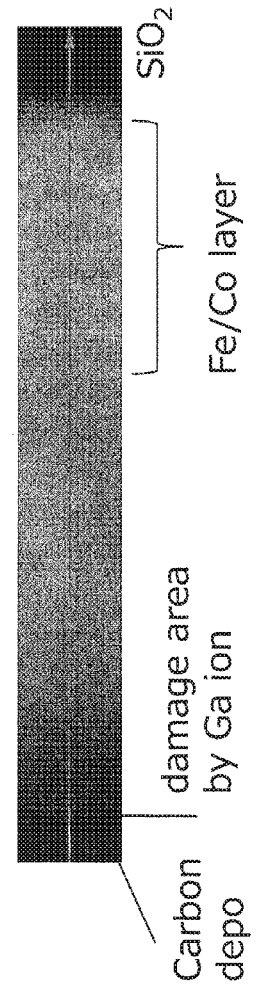
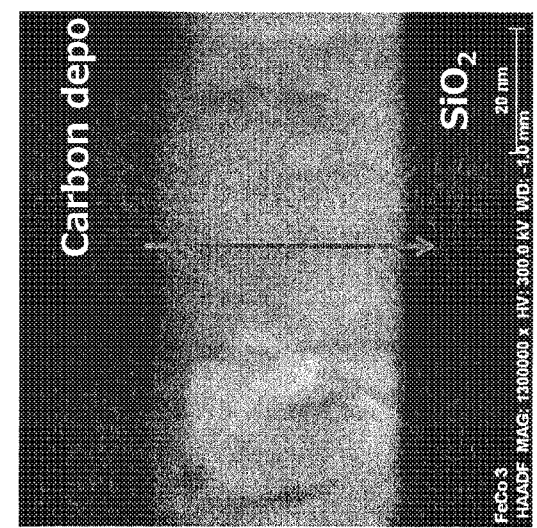

PERMANENT MAGNET AND ROTATING MACHINE INCLUDING THE SAME

The present invention relates to a permanent magnet and a rotating machine including the same.

BACKGROUND

The R-T-B based permanent magnet (R is rare earth element(s), T is Fe or Fe with a part of which replaced by Co, and B is boron) having a compound composed of a tetragonal $R_2T_{14}B$ structure as the main phase is known to have excellent magnetic properties and has been a representative permanent magnet with high performance since the invention (Patent Document 1) in 1982.

The excellent magnetic properties of the R-T-B based permanent magnet are attributable to magneto crystalline anisotropy of the tetragonal $R_2T_{14}B$ structure. Especially, the R-T-B based permanent magnets with the rare earth element(s) R being consisted of Nd, Pr, Dy, Ho and Tb have a large magneto crystalline anisotropy and are preferably used as permanent magnet materials. However, the rare earth element(s) R is unevenly distributed in some regions, and thus anxiety is caused from the viewpoint of the supply stability. In addition, as the rare earth element(s) R is easy to be oxidized, its corrosion resistance is low and an action such as Ni plating on the R-T-B based permanent magnets or the like is needed to prevent the rare earth element from oxidizing.

The magneto crystalline anisotropy is determined by the atomic arrangement and the shape of the electron cloud in the crystalline structure. In the mentioned compound composed of the $R_2T_{14}B$ structure, the c axis is parallel to an axis of easy magnetization, which is caused by that the $R_2T_{14}B$ structure is tetragonal. That is, that the crystalline structure is not isotropic is required for an excellent permanent magnet material and it is essential to show a high magnetic anisotropy.

Meanwhile, FeCo (i.e., permendur) is known as a practical material having a high saturation magnetization Is. The saturation magnetization Is of FeCo is 2.4T. It is much larger than the saturation magnetization Is (i.e., 2.2T) of Fe (i.e., pure iron), not to speak of the saturation magnetization Is (i.e., 1.6T) of $Nd_2Fe_{14}B$ which is a representative R-T-B based permanent magnet. However, FeCo has a bcc (body-centered-cubic) structure and an isotropic crystalline structure. Thus, its magnetic anisotropy is low and it can be used as an excellent soft magnetic material. That is, it is not suitable as a permanent magnet.

However, Non-Patent Document 1 suggests that the crystalline structure will become anisotropic and the magnetic anisotropy will be shown by distorting the crystalline structure of FeCo which has the isotropic body-centered-cubic structure to be a body-centered tetragonal structure. If magnetic anisotropy which is the source of the coercivity Hc is shown in FeCo, combining with its high saturation magnetization Is, it can be expected as an excellent permanent magnet material. However, the suggestion is based on first-principles calculation simulation, and thus the calculated value loses touch with the practical physical properties, for example, the calculated value is the value under absolute zero (0K).

According to the calculation simulation, the required tetragonal distortion for showing a sufficient magnetic anisotropy in FeCo is very large. It is required that the ratio of c/a of the c axis (which is the drawing direction) and the a axis (which is the compression direction) is about 1.2. The value is greatly larger than the elastic limit of the metal. Even a distortion to is applied to FeCo to reach c/a=1.2, distortion will not be introduced due to the plastic deformation which is caused by interatomic slip. That is, it is believed that it is very difficult to obtain a permanent magnet using the so-called FeCo alloy.

Patent Document 1: JPS59-46008

Non-Patent Document 1: Physical Review Letters, 027203-1, Volume 93, Number 2 (2004) "Giant Magnetic Anisotropy in Tetragonal FeCo Alloys"

Non-Patent Document 2: Digests of the 38th annual conference on magnetics in Japan, 4aE-1 (2014) "Magnetic properties of Rh/FeCo film grown on MgO (001) substrate"

SUMMARY

The present invention is made in view of such situation and is aimed to provide a permanent magnet with excellent magnetic properties even without rare earth element(s) R by introducing magnetic anisotropy to FeCo and showing coercivity Hc wherein the FeCo has a high saturation magnetization Is.

The permanent magnet of the present invention is characterized in that it has a periodic structure with the concentrations of Fe and T (T is one or more transition metal elements with Co or Ni as necessity) alternately changing, the concentration change with a period of 3.3 nm or less, and the concentration difference of Fe in the mentioned concentration change is 5 at % or more.

It is suggested by the first-principles calculation simulation that the crystalline structure becomes anisotropic and the magnetic anisotropy is shown by distorting the crystalline structure of FeCo which has an isotropic bcc structure to be a body-centered tetragonal structure. However, the required tetragonal distortion for showing a sufficient magnetic anisotropy in FeCo is very large. The ratio of c/a of the c axis (which is the drawing direction) and the a axis (which is the compression direction) is required to be about 1.2 and the value is greatly larger than the elastic limit of the metal. That is, it is considered that it is very difficult to obtain a permanent magnet using the so-called FeCo alloy.

If the solid material has some orientation relation in the interface, it can be called as epitaxy. In the case that the two across the interface are the same material, it is classified as homoepitaxy. In the case that the two materials across the interface are different from each other, it is classified as heteroepitaxy. In heteroepitaxy, it is known that when the lattice constants of the two materials are slightly different, the two materials are distorted to coordinate with each other. The distortion near the interface is a micro event with a level of atomic layer and is not limited by the micro physical properties such as elastic limit. That is, if the distortion at the heteroepitaxial interface is utilized, the tetragonal FeCo can be realized which is suggested by the first-principles calculation simulation.

As a method to obtain a heteroepitaxial interface, there are film methods such as molecular beam epitaxy (MBE) method or the like. The MBE method is a technique in which the atomic (or molecular) beam introduced into a high vacuum is controlled while a crystal having specific orientation relation with the ground crystal plane can be grown up. Thus, the MBE method can be used to prepare the periodic structure required in the present invention easily where the concentration of Fe and T alternately changes. However, in contrast to the excellent controllability of the crystal growth, MBE method has a very small deposition rate. Therefore, it is very difficult to obtain an enough size to produce sufficient magnetic flux required for a practical magnet by means of the film methods such as MBE method.

As a reported example of obtaining a tetragonal FeCo having the magnetic anisotropy by distortion of the heteroepitaxial interface, a FeCo film laminated on the Rh (rhodium) ground layer using a film method can be listed (Non-Patent Document 2). However, Rh is a platinum group element, so it is not suitable to be used as a permanent magnet material from the viewpoint of the amount resources and cost.

The present inventors have found that a body-centered tetragonal FeCo can be obtained by forming a periodic structure with an alternative change on the concentration of Fe and T with a period of 3.3 nm or less even if rare earth element(s) R or platinum group elements are not used. Additionally, they have found that the periodic structure can be obtained by accurately controlled diffusion even if a film method such as MBE method or the like (which is difficult to bulk) is not used.

If some sort of energy is applied to different solid materials existing cross the interface, diffusion occurs. The different solid materials are in a state of uniformly mixed together by diffusion and it is called as a solid solution. There are one case that the solid solution can be made from the whole composition and the other case that the solid solution can only be made from the limited composition range. The solid solution includes an interstitial solid solution (in which one substance takes up the interstices of the regular sites of another substance) and a substitutional solid solution (in which the regular sites of one substance are substituted by another substance). For example, Co substitutes the regular sites of Fe with the body-centered cubic (bcc) structure (which is the structure of Fe) maintained in an amount of about 80 at % relative to Fe. That is, FeCo can be obtained as a substitutional solid solution by the diffusion of Fe and Co.

The formation of the solid solution at the interface of different solid materials can be controlled by the applied energy, wherein diffusion is regarded as the driving force in the formation of the solid solution. That is, the diffusion distance can be controlled by the applied energy. The proper energy for controlling the diffusion of the solid material is heat and is applied as the product of temperature and time. For example, if sufficient heat energy (i.e., sufficient temperature or sufficient time) is applied to the diffusion at the interface of Fe and Co, a uniform FeCo solid solution can be obtained. On the other hand, if the heat energy is not sufficient, only a part of interface of Fe and Co will turn into FeCo solid solution, and Fe or Co which is not diffused will be residual.

It is known that the lattice constant of the FeCo solid solution can be continuously varied according to the composition (such as the ratio of Fe and Co). When the heat energy is not sufficient, the composition will continuously vary in the FeCo solid solution and the residual Fe or Co, wherein the FeCo solid solution is generated by the diffusion reaction at the interface of Fe and Co. It is considered that accompanying with the composition variation, the lattice constant also continuously varies, and the continuous variation of the lattice constant generates distortions continuously at a level of atomic layer. That is, magnetic anisotropy caused by distortion may be shown in the FeCo solid solution which is not sufficiently uniform and is generated from the interface of Fe and Co.

The structure after diffusion can be controlled by properly designing the structure (the cycle of Fe and Co) before diffusion. In order to obtain a FeCo solid solution with a little heat energy, the periodic structure of Fe and Co before diffusion can be made into a fine one. After a large amount of heat energy is applied, in order to keep the state i.e., the non-uniform FeCo solid solution, the periodic structure of Fe and Co before diffusion can be made into a large one. However, the FeCo solid solution prepared from Fe and Co with excessively large periodic structure cannot show a sufficient magnetic anisotropy (which is caused by distortion) due to slow variation of the composition (i.e., the variation of the lattice constant).

The structure after diffusion can be controlled by properly designing the structure (the ratio of Fe and Co) before diffusion. In order to obtain a periodic structure constructed of Fe and FeCo solid solution after diffusion, the ratio occupied by Fe in the structure before diffusion can be increased. In order to obtain a periodic structure constructed of FeCo solid solution and Co after diffusion, the ratio occupied by Co in the structure before diffusion can be increased.

In order to obtain FeCo as a substitutional solid solution by diffusion from the periodic structure of Fe and Co, the regular sites of Fe and Co should be substituted with each other and the required energy (the driving force of the diffusion) for the substitution of the regular sites should be provided from outside. However, when the periodic structure of Fe and Co is fine, the required energy for the substitution of the regular sites can be only a little. If excessive energy is provided, the obtained FeCo solid solution will become uniform. That is, in order to obtain FeCo solid solution with composition variation, the energy (heat energy in most cases) should be precisely controlled.

In order to obtain the FeCo solid solution with composition variation under relatively easy preparation conditions, it is effective to add X (X is element(s) composed of one or more selected from B, C and N). X is interstitial element(s) with an ion radius smaller than Fe or Co, and it can occupy the interstices of the regular sites to form an interstitial solid solution. When X occupies the interstices of the regular sites, Fe and Co are hardly substituted with each other, and a larger amount of energy is required in the diffusion. That is, even if the heat energy is not controlled precisely, a FeCo solid solution with composition variation can be obtained.

Among the FeCo solid solutions having the composition variation obtained by the diffusion of Fe and Co, the one having a fine enough periodic structure shows the magnetic anisotropy caused by distortion. However, the composition variation composed of fine periodic structure becomes uniform by the diffusion caused by only a little heat energy and thus the composition variation will vanish. That is, the FeCo solid solution with the composition variation has problem on the thermal stability and it is not suitable for the usage under a high temperature.

If it is difficult for Fe and Co to substitute with each other due to the interstitial element X occupying the interstices of the regular sites and a large amount of energy is required for the diffusion, the heat energy for making the FeCo solid solution having the composition variation uniform is required to increase. That is, the addition of the interstitial element X can make a contribution to the improvement of the thermal stability of the FeCo solid solution having the composition variation.

The interstitial element X can be located at any interstices of the regular sites of the FeCo solid solution, but it is selectively located at the specific interstices (where the energy of the system is the smallest) under proper conditions (such as concentration, temperature, and time). The crystal lattice of the FeCo solid solution can be distorted from a cubic crystal to a tetragonal crystal because of the interstitial element X which has been located at specific interstices, and thus the magnetic anisotropy caused by the distortion will be exhibited. That is, FeCo also can become a permanent magnet by the interstitial element X. However, in the FeCo distorted by the interstitial element X occupying specific interstices, the magnetic anisotropy changes due to the electron of X, and thus it is considered that the mentioned FeCo has a smaller magnetic anisotropy than the FeCo which has been simply distorted from a cubic crystal to a tetragonal crystal.

According to the present invention, a permanent magnet with excellent magnetic properties can be obtained by forming a periodic structure with the concentrations of Fe and T (T is one or more transition metal elements with Co or Ni as necessity) alternately changing even without the rare earth element R.

BRIEF DESCRIPTION OF THE DRAWINGS

FIG. 2A is the HAADF image of the sample having a periodic structure in which the concentrations of Fe and Co alternately change in Example 4 of the present invention.

FIG. 2B is the extracted and amplified HAADF image of the periodic structure portion.

FIG. 2C is the composition profile obtained from the periodic structure portion.

DETAILED DESCRIPTION OF EMBODIMENTS

Figures 1A, 1B:
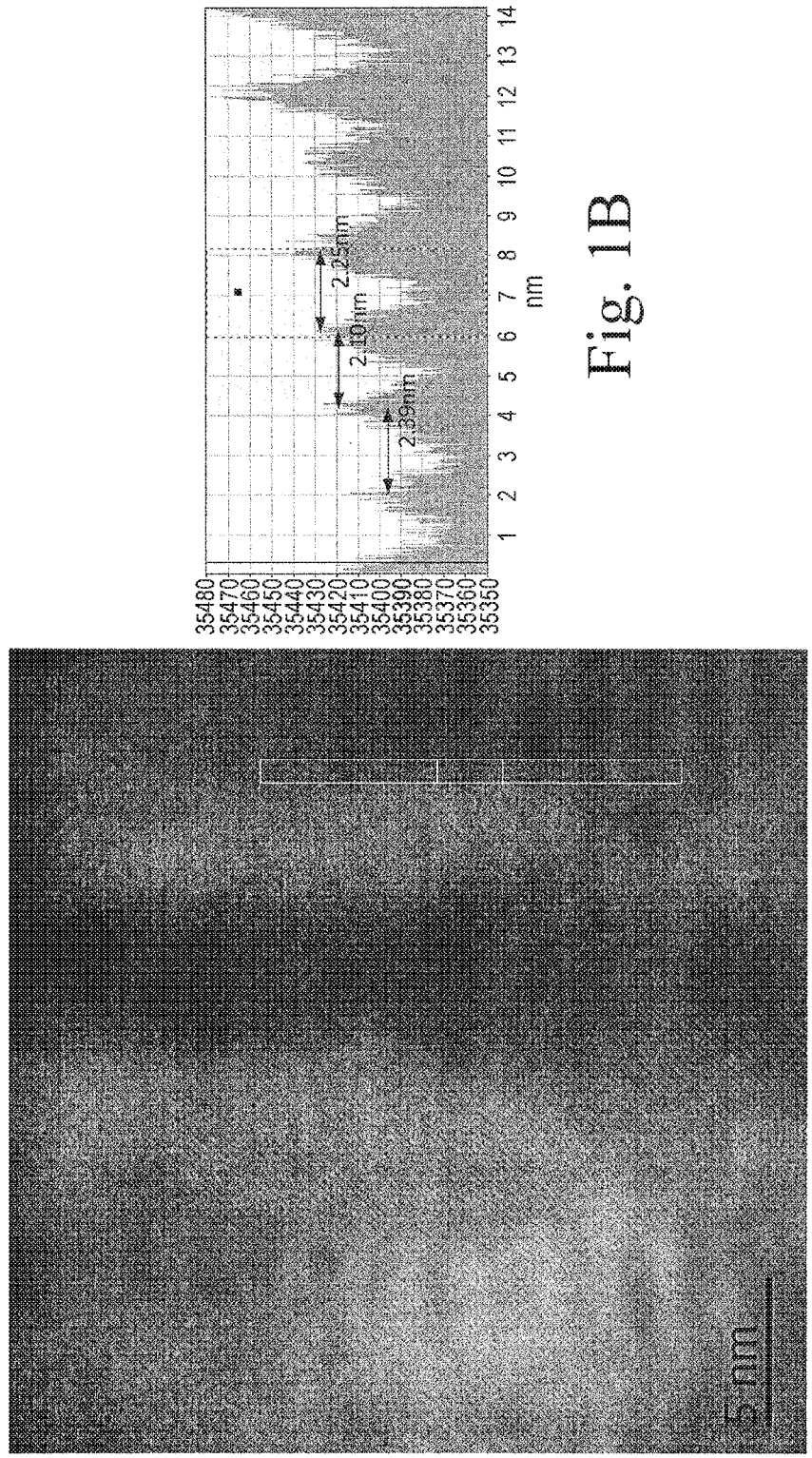
FIG. 1A is the HAADF image of the sample having a periodic structure in which the concentrations of Fe and Co alternately change in Example 4 of the present invention.
FIG. 1B is the luminance profile obtained from the rectangular region in the HAADF image in order to determine the length of the period.

Hereinafter, the preferred embodiment of the present invention will be described in detail. In addition, the embodiment is illustrative but not to limit the invention. Not all the features or combinations thereof described in the embodiment are essential for the present invention.

The permanent magnet of the present invention is characterized in that it has a periodic structure with the concentrations of Fe and T (T is one or more transition metal elements with Co or Ni as necessity) alternately changing, and the concentrations change with a period of 3.3 nm or less.

In the present embodiment, T is one or more transition metal elements with Co or Ni as the necessity. FeCo has the largest saturation magnetization Is of 2.4T as a practical material and can obtain excellent magnetic properties. In addition, the saturation magnetization Is of FeNi is 1.6T which is lower than that of FeCo, but it can obtain magnetic properties equal to those of the most excellent practical magnet material, i.e., $Nd_2Fe_{14}B$.

In the present embodiment, Fe and T have a periodic structure with their concentrations alternately changing. The alternate change of the concentrations can be continuous and also can be quantal. Further, it can be a combination of continuous change and quantal change. As a solid solution can be formed with a wide composition range by Fe and T, a continuous composition change can be realized. In addition, quantal composition change is caused by not only Fe and T, but also combinations such as the combination of Fe and FeT, the combination of FeT and T, the combination of Fe, FeT and T, the combination of FeT with excessive Fe and FeT with excessive T.

In the present embodiment, the concentrations of Fe and T alternately change with a period of 3.3 nm or less. Although the heteroepitaxial interface with the lattice constant being slightly different can be coherent with distortion, the distortion is slowly relaxed away from the interface. Thus, if the concentrations of Fe and T change with a too large period, no distortion is present in most part of the structure and thus magnetic anisotropy caused by distortion cannot be sufficiently exhibited.

In the present embodiment, the concentration difference of Fe in the periodic structure with the concentrations of Fe and T alternately changing is preferred to be 5 at % or more, and more preferred to be 10% or more. The lattice constant of the FeT solid solution varies continuously according to the composition wherein the FeT solid solution can be a substitutional solid solution in a wide composition range. Thus, when the difference of the composition at the heteroepitaxial interface is little, the difference of the lattice constant will also be little and the magnetic anisotropy caused by the distortion at the interface cannot be sufficiently generated.

In the present embodiment, the composition in the periodic structure with the concentrations of Fe and T alternately changing is $Fe_{1-x}T_x$ (wherein 0<x<1). The saturation magnetization Is increases slowly accompanying with the increase of x to achieve the largest value with x=0.7~0.8. After that, it turns to decrease accompanying with the increase of x. The coercivity HcJ increases sharply accompanying with the increase of x to reach the largest value with x=0.15, and after that it turns to decrease accompanying with the increase of x. Then, the coercivity HcJ decreases sharply when x>0.8. The range of x where both the saturation magnetization Is and the coercivity HcJ are excellent is $0.15 \leq x \leq 0.8$.

In the present embodiment, the crystalline structure in the periodic structure with the concentrations of Fe and T alternately changing includes body-centered tetragonal crystal or body-centered cubic crystal. The FeT solid solution which is a substitutional solid solution maintaining the crystalline structure of Fe, i.e., the bcc structure, with T substituting the regular sites of Fe has the same bcc structure as Fe. In addition, the bcc structure of the FeT solid solution can be varied to a body-centered tetragonal structure by the distortion caused by the mismatch of the lattice constant at the heteroepitaxial interface, and thus the magnetic anisotropy can be shown.

In the present embodiment, the composition in the periodic structure with the concentrations of Fe and T alternately changing can contain X (X is element(s) composed of one or more selected from B, C and N). X has a small ion radius and is an interstitial element which can occupy the interstices of the regular sites to form an interstitial solid solution, and it can hinder the diffusion of Fe and T. The FeT solid solution with the composition variation can be obtained under relatively easy preparation conditions by properly hindering the diffusion of Fe and T. That is, the FeT solid solution having the magnetic anisotropy can be easily obtained and the magnetic anisotropy is caused by the distortion which is accompanied with the variation of the lattice constant.

In the present embodiment, X can be helpful to distort the crystalline structure of FeT from a cubic crystal to a tetragonal crystal under proper conditions (such as concentration, temperature and time). The magnetic anisotropy can be generated by the distortion of the crystalline structure of FeT, however, the generated effect of the magnetic anisotropy caused by the additive element X is little compared to the case (where the FeT is simply turned into being tetragonal) because of the variation of the field caused by the electron of X.

Hereinafter, the preferred example of the preparation method of the present invention will be described.

In the present embodiment, the periodic structure with the concentrations of Fe and T alternately changing can be obtained by a film method or a mechanical alloying method. The film method can easily achieve the periodic structure with the concentrations of Fe and T alternately changing. However, in order to obtain sufficient magnetic flux required in the magnet for the magnetic field of the permanent magnet synchronous rotating machine widely used in livelihood, industries and transportation equipments, a bulk with a size of at least millimeter order is need, but it is not easy to prepare a bulk by the film method. The mechanical alloying method can provide a mixed microstructure by repeating rolling and folding using mechanical energy such as ball-milling or the like, and can prepare a sufficient amount of powders required in the bulk preparation. However, the mechanical alloying method requires several hours to several tens of hours in milling, so it is not easy to study different conditions. Here, in the present embodiment, the preferred state of the periodic structure with the concentrations of Fe and T alternately changing has been discovered in the investigation through the film method (sputtering method). Verification on the bulk preparation in the mechanical alloying method is performed based on the discovery obtained in the film method.

Hereinafter, the method for preparing a film sample having the periodic structure with the concentrations of Fe and T alternately changing (hereinafter, referred as FeT layer) by sputtering method is described.

As the starting raw material, a sputtering target is prepared. When co-deposition can be performed in the film deposition equipment, two or more sputtering targets of Fe and T (T is one or more transition metal elements with Co or Ni as necessity) can be prepared. When co-deposition cannot be carried out or it is difficult to carry out, several alloy targets with the desired compositions can be prepared. If two targets are to be prepared for the FeT layer, the combinations such as the combination of Fe and FeT, the combination of FeT and T, the combination of Fe, FeT and T, and the combination of FeT with excessive Fe and FeT with excessive T are considered to prepare. In addition, the additive element(s) X (X is element(s) composed of one or more selected from B, C and N) can be prepared as a target separately and also can be prepared as a compound target with X previously added.

The components in the atmosphere are adsorbed on the surface of the sputtering target. Especially, an oxide layer or a hydroxide layer can be formed on the surface of the sputtering target composed of metals with high reactivity through the reaction with the oxygen or the water vapor in the atmosphere. In order to remove the adsorption layer or the reaction layer and expose the pure sputtering target, it is effective to perform a pre-sputtering before the preparation of the film sample.

In order to prepare the film sample by the sputtering method, a substrate is required. As the substrate, various metals, glass, silicon or ceramics can be selected to use. However, considering that a heat treatment is required to obtain a desired FeT layer, the substrate is preferred to be a material with a high melting point. In addition, if the substrate has reactivity such as interdiffusion with the FeT layer, it is difficult to obtain the desired FeT layer under good control. Thus, the substrate is preferred to be a material which is difficult to react with the FeT layer. Further, in order to improve the adhesion between the desired FeT layer and the substrate, it is preferred to clean the substrate using a reverse sputtering mechanism equipped in the sputtering device and remove the adsorption layer on the surface.

A ground layer can be disposed between the substrate and the FeT layer. If the aim is to prevent the reaction of the substrate and the FeT layer, a material with a high melting point such as Mo or W or the like is preferably used as the ground layer. In addition, if the aim is to improve the orientation of the FeT layer, a material which can match with both the desired orientation plane of FeT layer and the substrate is preferably used as the ground layer.

The film deposition equipment (hereinafter, referred to as sputtering device) used in the preparation of the film sample through the sputtering method is preferred to have a film deposition chamber composed of a vacuum chamber which is capable of exhausting to be a pressure of $10^{-6}$ Pa or less in order to decrease the impurities (such as oxides, hydroxides) contained in the film sample. In addition, in order to maintain the film deposition chamber cleaning, the sputtering device is preferred to have a substrate introduction room which is capable of being connected with or isolated from the film deposition chamber freely. Further, in order to obtain the desired FeT layer after the pre-sputtering, the device is preferred to have a shielding mechanism between the substrate and the sputtering target which is capable of operating under an exhaust state.

In the sputtering method, the sputtering target is sputtered by the shock of the ionized noble gas particles during the electric discharge of the low-pressure noble gas (mainly Ar) and then it is deposited on the substrate to form a film, but the noble gas particles are contained in the film at that time. At this moment, if N (nitrogen) is introduced and mixed with the noble gas, N can be added as the interstitial element X. However, it is not preferred that the noble gas particles which do not contribute to the reaction are contained in the film.

In order to decrease the amount of the noble gas particles contained in the film, it needs to discharge in a noble gas atmosphere with lower pressure and deposit a film. As the sputtering method in which high-density plasma can be generated on the surface of the sputtering target and have a stable discharge and film deposition can be performed regardless the noble gas atmosphere with a low pressure, the magnetron sputtering method can be used.

In the magnetron sputtering method, high density plasma can be generated by the charged particles which perform a cycloidal motion due to the magnetic field and the electronic field on the surface of the sputtering target. The magnetic field on the surface of the sputtering target can be generated by the strong magnet disposed on the back side of the sputtering target. Thus, when the sputtering target is a ferromagnetic material having a high magnetic permeability, the sufficient magnetic field is not leaking on the surface of the sputtering target, and thus the discharge and film deposition cannot be performed stably. Therefore, when the ferromagnetic material is used as a sputtering target, the thickness should be adjusted properly.

The power used in the sputtering should be properly selected according to the material of the sputtering target. When the sputtering target is a conductor such as metal, the power can be optionally selected from DC and RF. However, when the sputtering target is an insulator, the power can be RF or RF superimposed DC. In the sputtering method, the deposition rate is approximately proportional to the deposition time and the input power under specific conditions (such as target material, pressure of the atmosphere, the atmosphere gas, and the distance between substrate and target). When the period of the desired FeT layer is small, the deposition time or the input power can be decreased, and the deposition rate can be reduced. Further, the deposition rate can be obtained by measuring the prepared sample under a specific condition using a contact-type step profiler. In addition, a quartz crystal film thickness meter equipped in the sputtering device can also be used.

In order to control the desired FeT layer precisely, the sputtering device is preferably capable of cooling the substrate. If a periodic structure with the concentrations of Fe and T alternately changing is to be obtained with a very small period, diffusion should be performed by a little energy and thus the whole composition becomes uniform. That is, the periodic structure with concentrations alternately changing cannot be obtained. In the sputtering method, the particles sputtered by the noble gas ion have high energy, and thus diffusion may be promoted excessively by the energy. In order to prevent the excessive diffusion caused by the energy of the sputtered particles, it is preferred to deprive the energy which is the driving force of the diffusion, i.e. to cool the substrate. It is very difficult to cool the substrate disposed in the vacuum chamber directly, and the substrate is usually cooled by thermal conduction with a cooled substrate holder which is cooled by a refrigerant. As the refrigerant to cool the substrate holder, a circulating cooling water (about 5~20° C.) or a fluorine-based inert liquid (about −120~50° C.) can be used and the temperature for cooling the substrate is preferred to be as low as possible. In addition, liquid nitrogen (−196° C.) can be used as the refrigerant, but there is a problem that the Ar gas usually used in the sputtering method will become solid under −196° C. so it cannot be used.

In order to control the desired FeT layer precisely, it is effective to subject the film sample to a heat treatment after film deposition. In order to obtain the FeT solid solution by the diffusion of Fe and T, it is effective to apply energy which will be the driving force of the diffusion, i.e. to perform a heat treatment. In addition, the crystalline property of the FeT layer can be improved by heating the substrate. The film prepared by the sputtering method has a crystalline property as low as amorphous and thus the magnetic anisotropy (magneto crystalline anisotropy) is hardly exhibited which is came from the atom distribution in the crystalline structure. The sufficient magneto crystalline anisotropy can be shown by improving the crystalline property through the heat treatment. In addition, the atmosphere during the heat treatment is preferred to be vacuum or inert gas flow in order to prevent the oxidation of the FeT layer, but N (nitrogen) can be added as the interstitial element X by using the nitrogen gas flow as the atmosphere during the heat treatment. Additionally, if the diffusion caused by heat treatment is excessive, the whole composition will become uniform and the periodic structure with the concentrations of Fe and T alternately changing cannot be obtained. Thus, a heat treatment device preferably controls the temperature and the time accurately.

Hereinafter, the method for preparing a bulk sample having the periodic structure with the concentrations of Fe and T alternately changing (hereinafter, referred as FeT layer) by the mechanical alloying method is described.

As the starting raw material, powder (hereinafter, referred as fine powder) with fine particle diameter is prepared. If the particle diameter of the fine powder is the same with the period in which the concentrations of Fe and T in the desired FeT layer change alternately, the desired FeT layer can be obtained with a little milling time, but the ultra fine powder with a nanometer order size has very high reactivity. Thus, it is difficult to treat. In addition, metals are rich in malleability and ductility, so they are difficult to be prepared into ultra fine powders. Because a mixed microstructure can be obtained by repeating rolling and folding due to milling for a long time, the fine powder with a proper particle diameter can be prepared with the required time for milling considered.

As the starting raw material, two or more fine powders can be prepared according to the desired FeT layer. If two fine powders are prepared to obtain the FeT layer, the combinations such as the combination of Fe and FeT, the combination of FeT and T, the combination of Fe, FeT and T, the combination of FeT with excessive Fe and FeT with excessive T can be considered. Further, the amount of the prepared fine powders can be weighed in advance according to the composition of the desired FeT layer. In addition, the additive element(s) X (X is element(s) composed of one or more selected from B, C and N) can be prepared as fine powder(s) separately and can also be prepared as fine powder of a compound added with X in advance.

When it is difficult to prepare metal powders such as Fe or T, oxides of Fe or oxides of T can also be used as the starting raw materials. Although metals are difficult to be micronized by milling due to malleability and ductility, the oxides may be easily micronized by milling because of lacking malleability and ductility and having brittleness. However, when oxides are used as the starting raw material, a reduction treatment is required to obtain the desired FeT layer.

A planetary ball mill can be used in the milling. The milling can apply mechanical energy to the fine powder which is the starting raw material. From the viewpoint of controlling the mechanical energy and controlling the atmosphere during milling, it is useful to use a ball mill. There are many kinds of the ball mill, such as rotary ball mill, vibratory ball mill, planetary ball mill, stirring ball mill and the like. The planetary ball mill is preferred as it can apply a large mechanical energy. The planetary ball mill can finish the treatment in a relatively short time because it makes the container with sealing the materials to be treated and the medium move in the way of rotating and revolving, and performs the milling effectively by the medium and the inner wall of the container. Further, efficiency of the milling can be improved by filling solvent into the container in addition to the materials to be treated and the medium.

The container and the medium used in the milling can be made of chromium steel or stainless steel. In a planetary ball mill continuously applying strong mechanical energy to the materials to be treated for a long time, not only the materials to be treated but also more than a little of the container or the medium are milled. As a result, the container or the medium is mixed into the materials to be treated as impurities. Thus, the materials of the container or the medium used in the milling are required to be the same as the materials to be treated or to be the ones which will not cause any problem if they are mixed as impurities. As the materials of the container or the medium used in the planetary ball mill, there are agate, aluminium oxide, tungsten carbide, zirconium oxide, silicon nitride, plastic polyamide and the like. In order to obtain the desired FeT layer, a container and medium made of chromium steel or stainless steel in which the main component is Fe are preferred to be used. The amount of the container and medium mixed into the materials to be treated as impurities can be estimated approximately based on the strength and the time of milling, so it can be reduced from the composition of the materials to be treated in advance. In addition, since chromium steel contains more carbon than stainless steel, chromium steel and stainless steel can be selected according to the amount of carbon contained as the additive element X In the reduction treatment of the materials to be treated, it is effective to mill in the hydrogen atmosphere. It is difficult to micronize the metals such as Fe or T by milling because of ductility and malleability, however, their oxides lack ductility and malleability and have brittleness and thus can be micronized by milling. Fine particles which cannot be obtained from milling metals can be obtained by milling and reducing the micronized fine powders of oxides in the hydrogen atmosphere. In addition, an atmosphere controlling container equipped with a valve can be used during the milling in the atmosphere. After the reduction treatment is finished, ventilating and milling can be repeated until the materials to be treated, i.e., oxides, turn into the fine metal powder.

The milling of the fine metal powder should be carried out at a non-oxidizing atmosphere. As the non-oxidizing atmosphere, argon gas or nitrogen gas is preferred. In order to prevent the fine metal powder from being nitridized in the milling, argon gas is preferred as the non-oxidizing atmosphere. However, in order to add N (nitrogen) as the interstitial element X, nitrogen gas can also be used as the atmosphere during the milling of the fine metal powder.

The milling of the fine metal powder is preferred to be carried out at a low temperature. If a strong mechanical energy is applied in a long time, the temperature of the fine metal powder increases and the ductility and malleability can be improved, as the result, it becomes more difficult to micronize the powder. In order to easily micronize the fine metal powder, cooling is effective. In addition, the reaction with the atmosphere can be prevented by cooling during the milling. Further, the materials to be treated can be cooled by filling the liquid nitrogen into the container together with the materials to be treated and the medium. The liquid nitrogen can be injected from the valve for atmosphere controlling and the liquid nitrogen can be properly added again because of the reduced amount caused by vaporization.

The fine powder (hereinafter, referred as FeT fine powder) having the periodic structure with the concentrations of Fe and T changing alternately obtained after milling is preferred to be treated in an inert atmosphere. As the FeT fine powder has a small particle diameter, it has a high activity and may react with atmosphere gas easily. In order to prevent the reaction, treatment in an inert atmosphere is required. A glovebox filled with argon gas or nitrogen gas can be used as the inert atmosphere, and the amount of the oxygen and the amount of the water in the glovebox can be controlled by an oxygen concentration meter and a dew point meter. Further, both the heat treatment and the molding process mentioned below are preferred to be performed in the glovebox.

The FeT fine powder is preferred to be heat treated. A mixed microstructure can be obtained by repeating rolling and folding in the way of continuously applying a strong mechanical energy for a long time. However, the matching at the interface of the mixed structure is not sufficient and the consistency at the interface can be improved by the heat treatment. On the other hand, if the diffusion caused by the heat treatment is excessive, the whole composition will become uniform and the periodic structure with the concentrations of Fe and T changing alternately cannot be obtained. Thus, it is preferred that the temperature and the time can be accurately controlled by a heat treatment equipment. In the heat treatment equipment (so-called electric furnace) which applies heat from outside, temperature will rise more quickly in the outer part than in the inner part, so a uniform heat treatment cannot be applied to the sample. Induction heating or pulse current heating is useful in which the sample is heated by itself. Further, the atmosphere during heat treatment is preferred to be vacuum or an inert gas flow from the viewpoint of preventing the oxidation of the FeT fine powder. Nitrogen can also be added as the interstitial element X by using the nitrogen gas flow as the atmosphere in the heat treatment.

The FeT fine powder is subjected to the compressing and sintering in the magnetic field. The FeT fine powder having the periodic structure with the concentrations of Fe and T changing alternately has the magnetic anisotropy, so it can be oriented by molding in the magnetic field and a bulk with the magnetic anisotropy can be obtained. In the compressing and sintering in a magnetic field, the applied magnetic field can be 800~1600 kA/m (10~20 kOe) and the compressing pressure can be 5~15 ton/cm$^2$ (500~1500 MPa). In addition, in the pulse electric sintering, the pulse current can be 5~10 kA and the pulse width can be 1~1000 ms.

The preferred embodiment of the preparation method for carrying out the present invention has been described above. Next, the method for analyzing the period of the periodic structure with the concentrations of Fe and T changing alternately, the composition and the crystalline structure is described with respect to the permanent magnet of the present invention. Further, the periodic structure with the concentrations changing alternately can be a continuous concentration change or a quantal concentration change or a combination of the continuous change and the quantal change. In addition, the quantal concentration change can be caused by not only Fe and T, but also combinations such as the combination of Fe and FeT, the combination of FeT and T, the combination of Fe, FeT and T, the combination of FeT with excessive Fe and FeT with excessive T. In the periodic structures under all cases, the period of the periodic structure, the composition and the crystalline structure can be analyzed by the method mentioned below.

The period of the periodic structure with the concentrations of Fe and T changing alternately can be determined by the high-angle annular dark-field (HAADF) image obtained from a scanning transmission electron microscope (STEM). The film or the bulk which is the sample is processed into a sheet with a thickness of 100 nm using a focused ion beam (FIB) instrument and then a HAADF image can be obtained by the STEM. As the luminance in the HAADF image is approximately proportional to the square of the atomic number, Fe and T can be distinguished. The luminance profile at the direction where the change of the periodic structure becomes the smallest is extracted from the HAADF image. The average change of the luminance in the 5 cycles is deemed as the length of the period. The HAADF image and the luminance profile obtained from the sample (in Example 4) which is prepared with the period of the periodic structure being 1.1 nm and the composition of the periodic structure being $Fe_{0.4}Co_{0.6}$ are shown in FIGS. 1A and 1B.

The composition of the periodic structure with the concentrations of Fe and T changing alternately can be determined by an energy dispersive spectroscopy (EDS) instrument equipped in the STEM. The EDS image is obtained from the area where the luminance profile of the HAADF image has been extracted. A composition profile is obtained at the direction where the change of the periodic structure of the HAADF image becomes the smallest and then it is quantified by a film compensatory function. In the quantified composition profile, the difference between the average value of the peak and the average value of the bottom is used as the concentration difference (at %) of Fe. In addition, the composition of the periodic structure with the concentrations of Fe and T alternately changing can be obtained from the average composition in the EDS image obtained from the area. The HAADF image and the composition profile obtained from the sample (in Example 4) which is prepared with the period of the periodic structure being 1.1 nm and the composition of the periodic structure being $Fe_{0.4}Co_{0.6}$ are shown in FIGS. 2A, 2B and 2C.

The crystalline structure in the periodic structure with the concentrations of Fe and T changing alternately can be observed from an electron diffraction image (EDI) which is obtained by STEM. In the preferred substitutional solid solution FeT of the present invention, T takes up the regular sites of Fe with the bcc structure of the crystalline structure of Fe maintained. But, if the amount of T is excessive, the bcc structure cannot be maintained, and the structure turns into a cubic closest packed (ccp) structure or a hexagonal closest packed (hcp) structure, which results from Co or Ni, i.e., T. Thus, it can be easily distinguished based on the electron diffraction image whether the crystalline structure in the periodic structure with the concentrations of Fe and T changing alternately is a body-centered structure or not. Further, the difference between the body-centered tetragonal structure and the body-centered cubic structure can be easily determined from the appearance of the diffraction spot which is accompanied with the decrease of the symmetry. Additionally, when most of the sample has the periodic structure with the concentrations of Fe and T changing alternately, the crystalline structure can be determined by the X-ray diffraction (XRD). The difference between the body-centered tetragonal structure and the body-centered cubic structure can also be distinguished in the XRD because a split or a broadening of the peak which reflects the symmetry can be clearly observed.

EXAMPLES

Hereinafter, the present invention is described in more detail based on examples and comparative examples, but the present invention is not limited to the following examples.

Preparation of Film Sample: Examples 1 to 29 and Comparative Examples 1 to 14

In the preparation of the film sample, a magnetron sputtering equipment capable of exhausting to be a pressure of $10^{-7}$ Pa or less was used. As the targets, Fe, Co, Ni, Cr and Mn were prepared with a purity of 99.9% and clean surfaces were exposed by pre-sputtering. As the substrate, a Si substrate (6 mm×6 mm×0.65 mm) with a thermal oxide film (1 μm) was prepared, and then cleaned sufficiently. After that, it was disposed on the substrate holder which had been controlled to be −50~200° C. after passing through the substrate introduction room. The film deposition was performed at an Ar gas atmosphere with a pressure of 1 Pa. When Co or Ni was deposited as the Fe layer and the T layer, all the electric powers applied to the targets were DC50W and the film thickness was controlled by the deposition time. When a compound composition such as FeNi was deposited as the T layer, the ratio of the electric powers applied to the targets was adjusted to obtain the desired composition ratio. The film deposition of the Fe layer and the T layer were repeated alternately and samples were obtained with the composition of the periodic structure being $Fe_{1-x}T_x$ (T was Co, Ni, $Co_{50}Ni_{50}$, $Co_{45}Ni_{45}Cr_{10}$ or $Co_{45}Ni_{45}Mn_{10}$, $0.0 \leq x \leq 1.0$), the period of the periodic structure being 0.3~7.9 nm and the total thickness being 8~48 nm. The laminated sample was subjected to a heat treatment using a lamp heating device. The heat treatment was performed in a vacuum with a pressure of $10^{-5}$ Pa or lower. After the sample was heated to 200° C. with a temperature rising rate of 0.5~50° C./s and then kept for 0~600 s, the sample was cooled to the room temperature with a cooling rate of 0.5~50° C./s.

Preparation of Bulk Sample: Example 30

In the preparation of the bulk sample, a planetary ball mill and a spark plasma sintering (SPS) instrument was used. As the starting raw materials, $Fe_2O_3$ powders and $Co_3O_4$ powders was prepared with a purity of 99.9% and a particle diameter of 3 μm or lower and weighed to obtain a composition of the periodic structure of $Fe_{1-x}Co_x$ (x=0.5). The raw materials together with the medium (Φ10 mm×30) made of stainless steel were sealed in a container (80 cc) made of stainless steel and equipped with a gas introduction valve, and then were milled for 15 hours to obtain the mixed fine powder of the oxides. Next, the atmosphere in the container containing the mixed fine powder of the oxides was replaced by hydrogen gas and then the replacement was repeated periodically while milling of 5 hours was carried out. The mixed fine powder of metals was obtained by the reduction. Then, the atmosphere in the container containing the mixed fine powder of metals was replaced by the nitrogen gas. Further, the liquid nitrogen was filled into the container while milling of 15 hours was performed to obtain FeT fine powder. After that, the FeT fine powder was tap filled into a graphite die in a glovebox which had been controlled to have a oxygen concentration of 5 ppm and a dew point of −70° C., and then was subjected to a heat treatment using pulse current heating. After the heat treatment, the FeT fine powder was compressed and sintered by an SPS instrument equipped with a mechanism which could apply an oriented magnetic field in the state of FeT fine powder filled into the graphite die.

Period of Concentration Change: Examples 1 to 5 and Comparative Examples 1 to 4

Samples were prepared with the composition of the periodic structure with the concentrations of Fe and T changing alternately (Hereinafter, referred to as periodic structure) being $Fe_{1-x}T_x$ (T=Co, x=0.6) and the period of the periodic structure (Hereinafter, referred to as period) changing in the range of 0.3 to 7.9 nm. As a result, the saturation magnetization Is and the coercivity HcJ were decreased accompanying with the increase of the period. Especially, when the period was larger than 3.3 nm, the coercivity HcJ significantly decreased to less than 30 kA/m. In addition, all the XRD patterns of the samples with a period of 3.3 nm or lower could be indexed to a body-centered cubic structure or a body-centered tetragonal structure. The present inventors thought that if the period was fine, the interface of Fe and Co would be increased and the saturation magnetization Is of the whole sample would increase by generating FeCo which has a larger saturation magnetization Is than Fe or Co near the interface. Further, the present inventors considered that the magnetic anisotropy caused by the distortion of FeCo would be exhibited and the coercivity would sharply increase by means of the period being extremely fine and the size being a size or smaller with which FeCo was involved in distortion.

Composition Ratio of Fe and T: Example 3, Examples 6~16, Comparative Examples 5 to 6

Samples were prepared with the period of the periodic structure being 1.1 nm and x changed in the range of 0.0~1.0, wherein, x was the ratio of T relative to Fe in the composition $Fe_{1-x}T_x$ (T=Co) of the periodic structure. As a result, although the saturation magnetization Is increased accompanying with the increase of x, it sharply decreased to 1.6T or less when x≥0.85 and x≤0.1. In addition, the concentration difference of Fe in the periodic structure in the range of 0.1≤x≤0.95 exceeded 5 at % and high magnetic properties were observed, i.e., the saturation magnetization Is≥1.6T and the coercivity HcJ≥30 kA/m. Further, the concentration difference of Fe in the periodic structure in the range of 0.15≤x≤0.8 was over 10 at %, and especially excellent magnetic properties were obtained, i.e., the saturation magnetization Is ≥1.7T and the coercivity HcJ≥70 kA/m. In addition, in the range where especially excellent magnetic properties were obtained, all the XRD patterns of the samples could be indexed to a body-centered cubic structure or a body-centered tetragonal structure. That is, it was known that in the range of 0.1≤x≤0.95 (preferably the range of 0.15≤x≤0.8), a permanent magnet with both a high saturation magnetization Is and a high coercivity HcJ could be obtained. The present inventors considered that the substitutional solid solution FeCo could substitute the regular sites of Fe with the body-centered cubic (bcc) structure (which was the structure of Fe) maintained was because the maximum of Co relative to Fe was about 80 at %. When x≥0.85, FeCo could not keep the bcc structure, and thus the coercivity HcJ reduced sharply.

Total Film Thickness: Example 3, Examples 17 to 21

Samples were prepared with the period of the periodic structure being 1.1 nm, the composition of the periodic structure being $Fe_{1-x}T_x$ (T=Co, x=0.6) and the total film thickness changed in the range of 8 to 48 nm. In all of the samples, the excellent magnetic properties could be obtained, i.e., the saturation magnetization Is ≥1.7T and the coercivity HcJ≥70 kA/m, regardless of the total film thickness. Further, in all of the samples, the concentration difference of Fe in the periodic structure exceeded 10 at % and all of the XRD patterns could be indexed to a bcc structure or a body-centered tetragonal structure. It was known that the film could be distorted at the interface with the substrate, but the same magnetic properties could be obtained regardless of the increase of the total film thickness (that is, the decrease of the ratio occupied by the interface between the substrate and the film in the film volume) in the periodic structure of the present invention, thus it was clear that the periodic structure was not caused by the distortion at the interface between the substrate and the film. That is, the present inventors considered that the structure with a period in the present invention had an inherent magnetic anisotropy and the magnetic anisotropy came from the distortion caused by the periodic structure.

Kind of Element T: Example 3, Examples 22 to 25

Samples were prepared with the period of the periodic structure being 1.1 nm, and the element T in the composition (i.e., $Fe_{1-x}T_x$ (x=0.6)) of the periodic structure being Co, Ni, $Co_{50}Ni_{50}$, $Co_{45}Ni_{45}Cr_{10}$, or $Co_{45}Ni_{45}Mn_{10}$. In all of the samples, the excellent magnetic properties could be obtained, i.e., the saturation magnetization Is ≥1.7T and the coercivity HcJ≥70 kA/m no matter what element the T was. Further, in all of the samples, the concentration difference of Fe in the periodic structure was over 10 at % and all of the XRD patterns could be indexed to a bcc structure or a body-centered tetragonal structure. That is, it was known that if T was one or more transition metal elements with Co or Ni as necessity, a permanent magnet with a high saturation magnetization Is and a high coercivity HcJ could be obtained.

Substrate Temperature During Film Deposition: Example 3, Example 26 and Comparative Examples 7 to 8

Samples were prepared with the period of the periodic structure being 1.1 nm, the composition of the periodic structure being $Fe_{1-x}T_x$ (T=Co, x=0.6), the total film thickness being 40 nm, and the substrate temperature during film deposition varying in the range of −50 to 200° C. The results showed that accompanying with the increase of the substrate temperature, the concentration difference of Fe in the periodic structure decreased significantly, and the coercivity HcJ significantly decreased to lower than 30 kA/m. The present inventors considered it was because that the sputtered particles having high energy would diffuse after they reached the substrate, but the diffusion was suppressed by cooling the substrate and thus the periodic structure with the concentrations of Fe and T changing alternately could be obtained. On the other hand, the present inventors considered that when the cooling of the substrate was not sufficient or the substrate was not heated, the sputtered particles which reached the substrate would diffuse and thus the periodic structure with the concentrations of Fe and T changing alternately could not be obtained. Additionally, the present inventors considered that if the substrate could be cooled at a lower temperature, the diffusion of the sputtered particles were decreased and a structure having a steeper concentration gradient (i.e., a steeper change of lattice constant) and a larger distortion could be obtained.

Temperature Rising Rate During Heat Treatment: Example 3, Example 27 and Comparative Examples 9 to 10

Samples were prepared with the period of the periodic structure being 1.1 nm, the composition of the periodic structure being $Fe_{1-x}T_x$ (T=Co, x=0.6), the total film thickness being 40 nm, the substrate temperature during film deposition being −50° C., and the temperature rising rate during heat treatment varying in the range of 0.5 to 50° C./s. As a result, accompanying with the decrease of the temperature rising rate, the concentration difference of Fe in the periodic structure decreased significantly, the coercivity HcJ significantly decreased to lower than 30 kA/m and the saturation magnetization Is increased slightly. The present inventors considered that when the temperature rising rate was large enough, a structure containing distortion generated by the periodic structure with the concentrations of Fe and T changing alternately could be obtained and the magnetic anisotropy caused by the distortion was exhibited. On the other hand, when the temperature rising rate was not large enough, the diffusion of Fe and T would was excessive and the whole composition became uniform, and thus the periodic structure with the concentrations of Fe and T changing alternately vanished wherein the periodic structure was essential to show the magnetic anisotropy generated by the distortion. Additionally, the present inventors considered that if the temperature rising rate could be further enlarged, the diffusion of Fe and T would be decreased and a structure having a steeper concentration gradient (i.e., a steep change of lattice constant) and a large distortion could be obtained.

Holding Time During Heat Treatment: Example 3, Example 28 and Comparative Examples 11 to 12

Samples were prepared with the period of the periodic structure being 1.1 nm, the composition of the periodic structure being $Fe_{1-x}T_x$ (T=Co, x=0.6), the total film thickness being 40 nm, the substrate temperature during film deposition being −50° C., and the holding time during heat treatment varying in the range of 0 to 600 s. The results showed that accompanying with the increase of the holding time, the concentration difference of Fe in the periodic structure decreased significantly, the coercivity HcJ significantly decreased to lower than 30 kA/m and the saturation magnetization Is increased slightly. The present inventors considered that when the holding time was short enough, a structure containing distortion generated by the periodic structure with the concentrations of Fe and T changing alternately could be obtained and thus the magnetic anisotropy caused by the distortion was shown. On the other hand, the present inventors considered that when the holding time was not sufficiently short, the diffusion of Fe and T was excessive and the whole composition became uniform, and thus the periodic structure with the concentrations of Fe and T changing alternately vanished wherein the periodic structure was essential to show the magnetic anisotropy generated by the distortion.

Cooling Rate During Heat Treatment: Example 3, Example 29 and Comparative Examples 13 to 14

Samples were prepared with the period of the periodic structure being 1.1 nm, the composition of the periodic structure being $Fe_{1-x}T_x$ (T=Co, x=0.6), the total film thickness being 40 nm, the substrate temperature during film deposition being −50° C., and the cooling rate during heat treatment varying in the range of 0.5 to 50° C./s. The results showed that accompanying with the decrease of the cooling rate, the concentration difference of Fe in the periodic structure decreased significantly, the coercivity HcJ significantly decreased to lower than 30 kA/m and the saturation magnetization Is increased slightly. The present inventors considered that when the cooling rate was large enough, a structure containing distortion caused by the periodic structure with the concentrations of Fe and T changing alternately could be obtained and the magnetic anisotropy generated by the distortion was expressed. On the other hand, the present invention considered that when the cooling rate was not large sufficiently, the diffusion of Fe and T was excessive and the whole composition became uniform, and thus the periodic structure with the concentrations of Fe and T changing alternately vanished wherein the periodic structure was essential to show the magnetic anisotropy generated by the distortion. Additionally, the present inventors thought that if the cooling rate could be further enlarged, the diffusion of Fe and T would be decreased and a structure having a steeper concentration gradient (i.e., a steep change of lattice constant) and a large distortion could be obtained.

Film and Bulk: Example 3 and Example 30

In the samples with the period of the periodic structure being 1.1 nm and the composition of the periodic structure being $Fe_{1-x}T_x$ (T=Co, x=0.6), the same magnetic properties could be obtained no matter what shape the sample was. It was known that a film could be distorted at the interface with the substrate, but the present inventors considered that in the present invention where the same magnetic properties as those of the film could be obtained even in a bulk, an inherent magnetic anisotropy was shown in the structure having a period and the magnetic anisotropy was generated from the distortion caused by the periodic structure.

TABLE 1

| | Preparation conditions | | | | | | Structure | | Magnetic properties | |
| | Film deposition | Heating treatment | | | | | | | | |
| | Substrate temperature | Temperature rising rate | Holding time | Cooling rate | Composition | | Total film thickness | Period of concentration change of Fe and T (nm) | Concentration difference of Fe (at %) | Saturation magnetization Is (T) | Coercivity HcJ (kA/m) |
| | (° C.) | (° C./s) | (s) | (° C./s) | T | x | (nm) | | | | |
|---|---|---|---|---|---|---|---|---|---|---|---|
| Example 1 | −50 | 50 | 0 | 50 | Co | 0.60 | 40 | 0.3 | 7.44 | 1.95 | 82.75 |
| Example 2 | −50 | 50 | 0 | 50 | Co | 0.60 | 40 | 0.7 | 10.32 | 1.95 | 81.73 |
| Example 3 | −50 | 50 | 0 | 50 | Co | 0.60 | 40 | 1.1 | 12.56 | 1.93 | 80.00 |
| Example 4 | −50 | 50 | 0 | 50 | Co | 0.60 | 40 | 2.2 | 15.10 | 1.70 | 72.64 |
| Example 5 | −50 | 50 | 0 | 50 | Co | 0.60 | 40 | 3.3 | 94.22 | 1.62 | 70.10 |
| Example 6 | −50 | 50 | 0 | 50 | Co | 0.10 | 40 | 1.1 | 5.22 | 1.60 | 69.80 |
| Example 7 | −50 | 50 | 0 | 50 | Co | 0.15 | 40 | 1.1 | 14.34 | 1.71 | 100.80 |
| Example 8 | −50 | 50 | 0 | 50 | Co | 0.20 | 40 | 1.1 | 12.62 | 1.72 | 92.40 |
| Example 9 | −50 | 50 | 0 | 50 | Co | 0.30 | 40 | 1.1 | 16.10 | 1.73 | 79.02 |
| Example 10 | −50 | 50 | 0 | 50 | Co | 0.40 | 40 | 1.1 | 13.62 | 1.77 | 75.36 |
| Example 11 | −50 | 50 | 0 | 50 | Co | 0.50 | 40 | 1.1 | 11.23 | 1.91 | 81.20 |
| Example 12 | −50 | 50 | 0 | 50 | Co | 0.70 | 40 | 1.1 | 19.36 | 2.03 | 82.72 |
| Example 13 | −50 | 50 | 0 | 50 | Co | 0.80 | 40 | 1.1 | 21.78 | 1.99 | 72.09 |
| Example 14 | −50 | 50 | 0 | 50 | Co | 0.85 | 40 | 1.1 | 9.82 | 1.84 | 30.34 |
| Example 15 | −50 | 50 | 0 | 50 | Co | 0.90 | 40 | 1.1 | 8.33 | 1.78 | 30.25 |
| Example 16 | −50 | 50 | 0 | 50 | Co | 0.95 | 40 | 1.1 | 6.35 | 1.64 | 30.11 |
| Example 17 | −50 | 50 | 0 | 50 | Co | 0.60 | 8 | 1.1 | 12.92 | 2.01 | 94.56 |
| Example 18 | −50 | 50 | 0 | 50 | Co | 0.60 | 16 | 1.1 | 12.93 | 1.90 | 98.07 |
| Example 19 | −50 | 50 | 0 | 50 | Co | 0.60 | 24 | 1.1 | 12.01 | 1.98 | 93.45 |

TABLE 1-continued

| | Preparation conditions | | | | | | Structure | | Magnetic properties | |
|---|---|---|---|---|---|---|---|---|---|---|
| | Film deposition | Heating treatment | | | | | | | | |
| | Substrate temperature | Temperature rising rate | Holding time | Cooling rate | Composition | | Total film thickness | Period of concentration change of Fe and T (nm) | Concentration difference of Fe (at %) | Saturation magnetization Is (T) | Coercivity HcJ (kA/m) |
| | (° C.) | (° C./s) | (s) | (° C./s) | T | x | (nm) | | | | |
| Example 20 | −50 | 50 | 0 | 50 | Co | 0.60 | 32 | 1.1 | 12.99 | 1.85 | 81.52 |
| Example 21 | −50 | 50 | 0 | 50 | Co | 0.60 | 48 | 1.1 | 12.67 | 1.89 | 91.07 |
| Example 22 | −50 | 50 | 0 | 50 | Ni | 0.60 | 40 | 1.1 | 10.64 | 1.81 | 72.10 |
| Example 23 | −50 | 50 | 0 | 50 | $Co_{50}Ni_{50}$ | 0.60 | 40 | 1.1 | 13.40 | 1.85 | 74.90 |
| Example 24 | −50 | 50 | 0 | 50 | $Co_{45}Ni_{45}Cr_{10}$ | 0.60 | 40 | 1.1 | 11.31 | 1.70 | 77.00 |
| Example 25 | −50 | 50 | 0 | 50 | $Co_{45}Ni_{45}Mn_{10}$ | 0.60 | 40 | 1.1 | 13.08 | 1.70 | 79.30 |
| Example 26 | −20 | 50 | 0 | 50 | Co | 0.60 | 40 | 1.1 | 10.05 | 1.96 | 70.75 |
| Example 27 | −50 | 20 | 0 | 50 | Co | 0.60 | 40 | 1.1 | 9.61 | 1.98 | 59.98 |
| Example 28 | −50 | 50 | 6 | 50 | Co | 0.60 | 40 | 1.1 | 10.88 | 1.91 | 71.83 |
| Example 29 | −50 | 50 | 0 | 20 | Co | 0.60 | 40 | 1.1 | 10.06 | 1.96 | 72.57 |
| Example 30 | — | — | — | — | Co | 0.60 | bulk | 1.1 | 13.28 | 1.88 | 70.30 |
| Comparative Example 1 | −50 | 50 | 0 | 50 | Co | 0.60 | 40 | 4.5 | 98.55 | 1.55 | 27.74 |
| Comparative Example 2 | −50 | 50 | 0 | 50 | Co | 0.60 | 40 | 5.6 | 97.10 | 1.57 | 22.40 |
| Comparative Example 3 | −50 | 50 | 0 | 50 | Co | 0.60 | 40 | 6.7 | 99.53 | 1.56 | 14.10 |
| Comparative Example 4 | −50 | 50 | 0 | 50 | Co | 0.60 | 40 | 7.9 | 99.69 | 1.58 | 6.50 |
| Comparative Example 5 | −50 | 50 | 0 | 50 | Co | 0.00 | 40 | — | — | 1.32 | 61.78 |
| Comparative Example 6 | −50 | 50 | 0 | 50 | Co | 1.00 | 40 | — | — | 1.58 | 20.22 |
| Comparative Example 7 | 20 | 50 | 0 | 50 | Co | 0.60 | 40 | 1.1 | 3.83 | 2.03 | 29.99 |
| Comparative Example 8 | 200 | 50 | 0 | 50 | Co | 0.60 | 40 | 1.1 | 0.64 | 2.09 | 21.80 |
| Comparative Example 9 | −50 | 0.5 | 0 | 50 | Co | 0.60 | 40 | 1.1 | 1.40 | 2.12 | 23.60 |
| Comparative Example 10 | −50 | 5 | 0 | 50 | Co | 0.60 | 40 | 1.1 | 4.88 | 2.01 | 24.90 |
| Comparative Example 11 | −50 | 50 | 60 | 50 | Co | 0.60 | 40 | 1.1 | 4.31 | 1.92 | 28.78 |
| Comparative Example 12 | −50 | 50 | 600 | 50 | Co | 0.60 | 40 | 1.1 | 1.49 | 1.96 | 25.84 |
| Comparative Example 13 | −50 | 50 | 0 | 0.5 | Co | 0.60 | 40 | 1.1 | 1.74 | 2.23 | 24.67 |
| Comparative Example 14 | −50 | 50 | 0 | 5 | Co | 0.60 | 40 | 1.1 | 4.78 | 2.06 | 26.80 |

As set forth above, the permanent magnet according to the present invention has a high saturation magnetization Is and a high coercivity HcJ and can be prepared even without the rare earth element(s) R, and thus it is useful for the magnetic field of the permanent magnet synchronous rotating machine which is widely used in the livelihood, industries and transportation equipments.

What is claimed is:

1. A permanent magnet comprising a periodic structure in which concentrations of Fe and T change alternately,
    wherein T is at least one of Co or Ni, optionally with one or more additional transition metal elements,
    the concentrations change with a period of 3.3 nm or less, and
    a concentration difference of Fe in the concentration change is 5 at % or more.

2. The permanent magnet according to claim 1, wherein an average composition of the periodic structure is $Fe_{1-x}T_x$ $(0.15 \leq x \leq 0.8)$.

3. A rotating machine comprising the permanent magnet according to claim 1.

4. A rotating machine comprising the permanent magnet according to claim 2.

* * * * *